(12) United States Patent
Willinger

(10) Patent No.: US 6,374,777 B1
(45) Date of Patent: Apr. 23, 2002

(54) TANGLE FREE PET RESTRAINT

(75) Inventor: Jonathan Willinger, Tenafly, NJ (US)

(73) Assignee: J W Pet Company, Inc., Hasbrouck Heights, NJ (US)

( * ) Notice: Subject to any disclaimer, the term of this patent is extended or adjusted under 35 U.S.C. 154(b) by 0 days.

(21) Appl. No.: 09/525,585

(22) Filed: Mar. 15, 2000

(51) Int. Cl.[7] .............................. A01K 3/00; A01K 1/04
(52) U.S. Cl. ....................................... 119/791; 119/787
(58) Field of Search .................................. 119/786, 787, 119/788, 791

(56) References Cited

U.S. PATENT DOCUMENTS

| | | | | |
|---|---|---|---|---|
| 824,182 A | * | 6/1906 | Knoff | 119/786 |
| 871,564 A | * | 11/1907 | Brown | 119/786 |
| 942,859 A | * | 12/1909 | Kersey | 119/786 |
| 2,087,176 A | | 7/1937 | Webb | 119/787 |
| 2,525,890 A | | 10/1950 | Gage | 119/787 |
| D353,477 S | | 12/1994 | Terry | |

* cited by examiner

*Primary Examiner*—Robert P. Swiatek
(74) *Attorney, Agent, or Firm*—Rosenman & Colin LLP

(57) ABSTRACT

A pet restraint constructed from an elongated stake having a leash-receiving section positioned near the upper end of the stake and a ground-insertable section at the lower end of the stake. At least one snag-free surface member having a ground-engaging element is connected to the stake near the leash-receiving section and extends between the leash-receiving section and the ground to provide a snag-free, tangle-free pet restraint. The snag-free surface member is preferably further adapted to maintain the upper end of the pet restraint at a certain height from the ground so as to be conspicuous to any passerby.

21 Claims, 4 Drawing Sheets

TANGLE FREE PET RESTRAINT

FIELD OF THE INVENTION

This invention relates to a pet restraint generally, and more particularly to a ground-insertable stake having a unique, tangle-free configuration.

BACKGROUND OF THE INVENTION

Household pets have a variety of personalities. Some animals are lethargic, and exist mainly to occupy space in their owner's home. Other animals seem to be filled with unlimited energy, which can be hazardous to the owner's fragile or precious belongings. If not controlled or constructively channeled, this energy can wreak havoc on the relationship between pet and owner, and cause the owner to restrain or otherwise restrict the movement of the pet while indoors. This can cause the pet to feel caged, unwanted and even depressed.

For an owner of an active pet, there is no greater joy than being able to maintain the pet in an outdoor environment, where the animal is allowed to roam and play within the boundaries provided by a restraint, without constant attention from the pet owner. Conventional methods of restraint, such as, for example, tying the animal's leash around a tree or a fence post, are fraught with deficiencies. Assuming the property actually contains a tree or a fence post, the leash usually gets caught, twisted, tightened or otherwise constricted thereabout, resulting in a severe reduction in mobility of the animal. Thus, the ability of the pet owner to attend to other matters is severely restricted if such pet owner has to routinely "free" the tangled animal from the restraint.

Other conventional restraining methods, such as augur-type stakes having loops on their exposed ends, also tend to be deficient in many respects. Such stakes tend to be essentially hidden from view, and pose a serious tripping or lawnmower blade hazard to the unwary. Such stakes also tend to be forgotten, and if anchored deep enough into the ground, may never be used again until someone mistakenly trips over them. In addition, many of the conventional stakes do not achieve their primary function of providing free mobility to the animal, and are often equipped with surfaces that catch or otherwise cause a tightening of the leash thereabout. Once the leash catches on the restraint, it is usually just a matter of time before the leash winds around itself until the animal is no longer able to move.

Even a simple stake equipped with a stop plate arranged thereon, which plate is supposed to come to rest upon the ground and limit over-insertion of the stake, has several shortcomings. First, the stop plate is usually much closer to the top of the stake near the leash-receiving section than the pointed bottom of the stake, and thus assumes that the user will, or will even be able to, insert the stake to the appropriate depth where the plate is flush with the ground. If the stake is not inserted to a point where the stop plate is flush with the ground, the "floating" plate becomes a surface or location that is ripe for entanglement. Second, even if the user is able to insert the stake to a point where the plate contacts the ground, the contact surface of the plate is easily moveable under the slightest forceful movement from the animal, which often results in a gap between the plate and the ground and yet another critical location of entanglement. Since the plate doesn't actually engage or penetrate into the ground, there is always a high probability that entanglement will occur near or around the upper and/or lower surface of the plate.

A pet restraint should therefore serve at least two critical functions. First, it must restrain the animal within a certain defined boundary. Second, it must allow the animal to move freely within such boundary. Obviously from a human perspective, the restraint should also be easy to use, sturdy in design and easy to locate while inserted into the ground. As noted above, one of the major shortcomings of the prior art is the problem of entanglement caused by constructional limitations or improper use of the restraint. Cognizant of the problems plaguing the prior art, the present inventor has devised a tangle-free pet restraint having a unique construction that overcomes such shortcomings.

The ground-insertable pet restraint of the present invention comprises an elongated stake having a leash-receiving section for attachment of an animal leash thereto. The restraint further comprises a ground-engaging, snag-free surface member defined between the leash-receiving section of the stake and the ground, which prevents an animal's leash from tangling on or wrapping about the restraint. Because the snag-free surface member is ground-engaging, an animal is unable to separate the snag-free surface member from the ground and thereby create a gap location that is ripe for entanglement. In addition, through the use of an outwardly flaring, snag-free surface member, the restraint of the present invention is conspicuously insertable into the ground, and less capable of becoming hidden, forgotten, tripped over or cut up by a lawnmower blade or the like.

OBJECTS OF THE INVENTION

It is an object of the present invention, therefore, to provide a pet restraint that is tangle-free and snag-free.

It is a further object of the present invention to provide a pet restraint that is conspicuously insertable into the ground.

It is a still further object of the present invention to provide a pet restraint that allows an animal restrained thereto by a leash or the like to move freely around the restraint without getting caught or tangled about a surface or constructional feature of such restraint.

Still other objects and advantages of the invention will become clear upon review of the following detailed description in conjunction with the appended drawings.

SUMMARY OF THE INVENTION

A pet restraint is constructed from an elongated stake having a leash-receiving section positioned near the upper end of the stake and a ground-insertable section at the lower end of the stake. A snag-free surface member having a ground-engaging element is connected to the stake near the leash-receiving section and extends between the leash-receiving section and the ground to provide a snag-free, tangle-free pet restraint. The snag-free surface member is preferably further adapted to maintain the upper end of the pet restraint at a certain height from the ground so as to be conspicuous to any passerby.

DETAILED DESCRIPTION OF THE PREFERRED EMBODIMENTS

Figure 1:
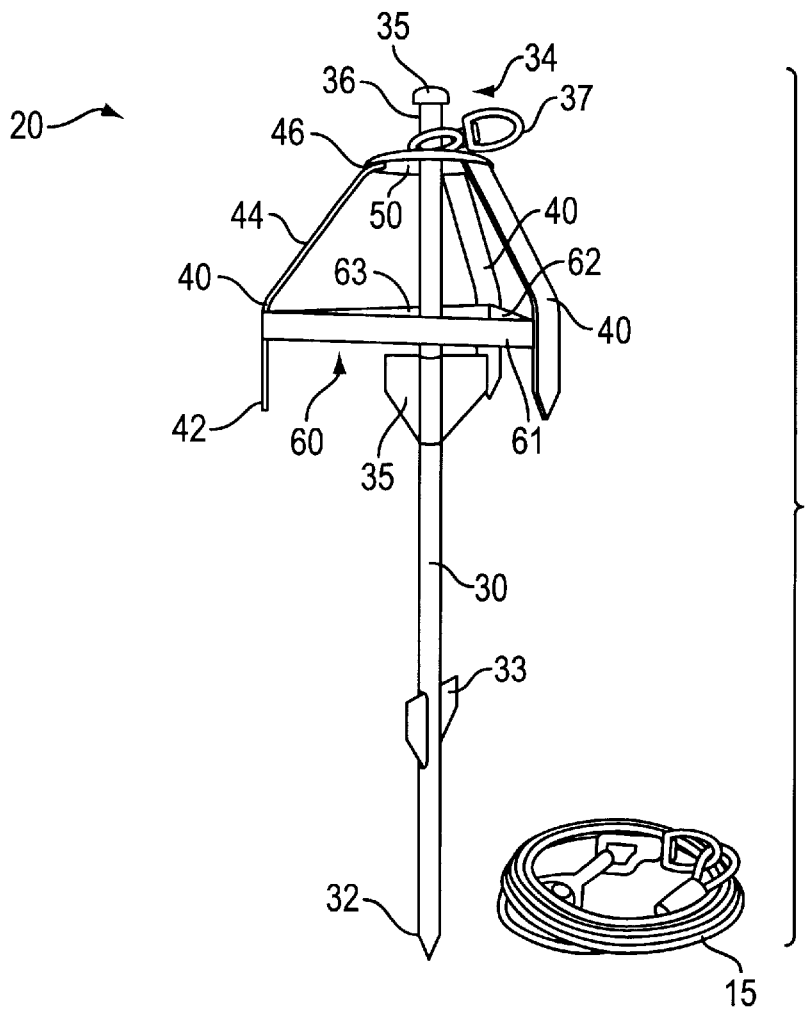
FIG. 1 is a front view of the pet restraint of the present invention shown with a leash that could be used in connection therewith.

The apparatus of the present invention meets and fulfills all the critical requirements of an operable, hassle free pet restraint. It maintains an animal within a defined locus centered around the restraint, and allows the animal to move freely thereabout. It is constructed with a snag-free surface that prevents entanglement of the animal's leash on or about the restraint, and thereby releases the owner from the aggravating task of having to untangle the animal from a restraint specifically used to allow free mobility.

When inserted into the ground, the pet restraint of the present invention is raised or elevated an appreciable distance so as to be conspicuous to the eye. This prevents unnecessary tripping and falling and/or injury to unwary passersby. It also prevents injury to lawnmower blades and the like, particularly if the owner forgets to remove the restraint from the ground before mowing.

The pet restraint of the present invention is specifically designed to create a tangle-free, snag-free environment between a leash-receiving section of the restraint and the ground. It creates such an environment through the use of a ground-engageable snag-free surface that is separate and distinct from the stake that primarily anchors the restraint to the ground. Such snag-free surface prevents an animal's leash from becoming tangled about the restraint, while the ground-engaging aspect of the snag-free surface prevents the creation of a tangle-prone gap between the restraint and the ground as a result of a slight lifting of the restraint from the ground under the forceful tug from an animal.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

Figure 2:
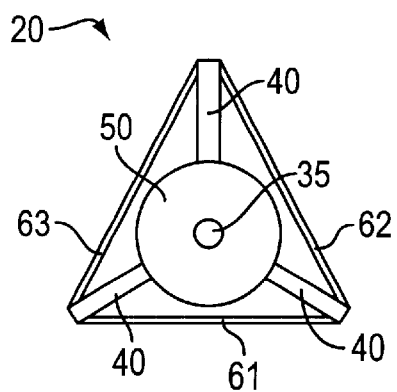
FIG. 2 is a top view of the pet restraint of FIG. 1.

FIG. 1 is a front view of the pet restraint of the present invention 20 shown with a leash 15 that could be used in connection therewith. The pet restraint 20 comprises an a elongated stake 30 having a lower end 32 adapted to be inserted into the ground 100 (see FIG. 11), an upper end 34 adapted to be positioned at a distance above the ground 100 (see FIG. 11) and a leash-receiving section 36 adjacent said upper end 34 of said stake 30 for attachment of a leash 15 thereto. The stake 30 might further be provided with one or a plurality of rotation-prevention members 33,35 to inhibit rotation of the stake 30 while "planted." Such rotation-prevention members 33,35 might be arranged in different orientations as shown. The leash-receiving section 36 is preferably further provided with a coupling 37 that is movable around said stake 30 for coupling the leash 15 to the restraint 20. In this regard, the upper end 34 of the stake 20 preferably further comprises an enlarged diameter portion 35 to prevent removal of said coupling 37 from said stake 30. FIG. 2 is a top view of the restraint 20 of FIG. 1 shown for purposes of illustration without the coupling 37, while FIG. 11, which will be described in more detail later, is a front view of the pet restraint 20 of FIGS. 1 and 2 inserted into the ground 100 with the leash 15 attached thereto.

Figure 11:
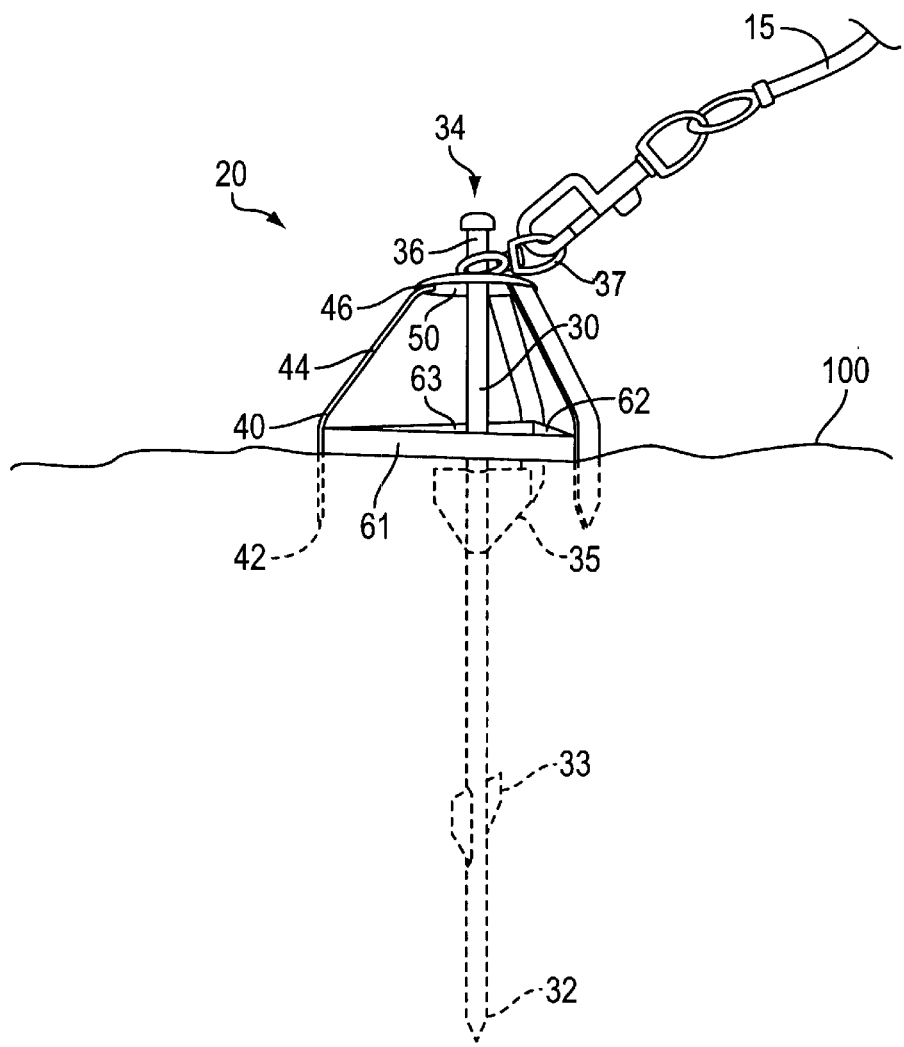
FIG. 11 is a front view shown partially in phantom of the pet restraint of FIG. 1 inserted into the ground with a partially-shown leash attached thereto.

As shown in FIGS. 1, 2 and 11, the pet restraint 20 further comprises at least one snag-free surface member 40 connected at one end or connection location 46 to the stake via a preferably disc-shaped connection plate 50, and has a downwardly projecting, ground engaging element 42 provided at its other end. The connection plate 50 provides a smooth contact surface and acts as a stop for the movable coupling 37 as shown in FIG. 11. An intermediate portion 44 of the snag-free surface member 40 is preferably outwardly projecting or outwardly flared with respect to the stake 30, or positioned at an angle to the longitudinal axis of the stake 30. As shown more particularly in FIG. 11, the outwardly flared portion 44 of the snag-free surface member 40 provides for a tangle-free, downwardly slanted surface profile between the leash-receiving section 36 of the stake 30 and the ground 100 into which the ground-engaging element 42 is inserted.

In the embodiment of FIGS. 1, 2 and 11, there is shown a plurality of snag-free surface members 40 in the form of ground-engaging prongs 40, said prongs 40 being further structurally supported by a stop member 60 connected therebetween, which is shown as a continuous triangular piece formed from a plurality of elements 61–63. While a triangular stop member 60 is shown, it will be understood that any shape may be used. As shown more particularly in FIG. 11, the stop member 60 also preferably limits insertion of the restraint 20 into the ground 100. The position of the stop member 60 can be varied along the snag-free surface member 40.

Use and operation of the pet restraint 20 is fairly straightforward. The stake 30 of the restraint 20 is inserted into the ground 100 as shown in FIG. 11 until the ground-engaging elements 42 of the snag-free surface members 40 have sufficiently penetrated into the ground 100. Such penetration may, as discussed above, be limited by the stop member 60, or if a stop member is not present, then by the slanted surfaces 44 of the snag-free surface members 40. A leash 15 connected on one end to an animal (not shown) is attached at the other end to the coupling 37, which coupling is freely movable about the leash-receiving section 36 of the stake 30. Regardless of how the animal moves around the restraint 20, the leash 15 is prevented from becoming snagged or tangled on the restraint due to the ground-engaging, snag-free surface members 40 positioned between the leash-receiving section 36 and the ground 100. The restraint 20 is further supported in the ground 100 due to the outwardly flared, ground-engaging nature of the snag-free surface members 40 positioned around the stake 30. The insertion of such members 40 in the ground 100 provides additional support against removal and rotation of the restraint 20 while "planted," and the rotation-prevention members 33,35, if attached to the stake 30, provide even more protection against twisting and removal.

In FIGS. 1, 2 and 11, the snag-free surface members 40 are shown as three ground-engaging prongs 40 equally spaced apart from each other (see in particular FIG. 2). It is structurally preferable, although not necessary, if the snag-free surface members 40 are positioned at equal intervals about the stake 30. Unequal spacing (not shown) will also be operable.

Figure 12:
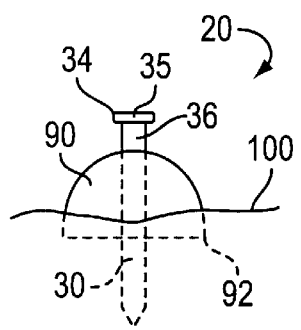
FIG. 12 is a front view shown partially in phantom of the pet restraint of FIG. 8 inserted into the ground.

While FIGS. 1, 2 and 11 represent the preferred embodiment of the pet restraint 20, several alternative embodiments shown in FIGS. 3–10 and 12 are also contemplated. Such alternative embodiments are not meant to be limiting in any respect, but are merely illustrative of possible structural variations. FIGS. 3–9 are all top views similar to FIG. 2 with the coupling 37 removed for purposes of illustration from FIGS. 3–8, FIG. 10 is a front view of FIG. 9, while FIG. 12 is a front view showing use similar to that of FIG. 11.

Figure 3:
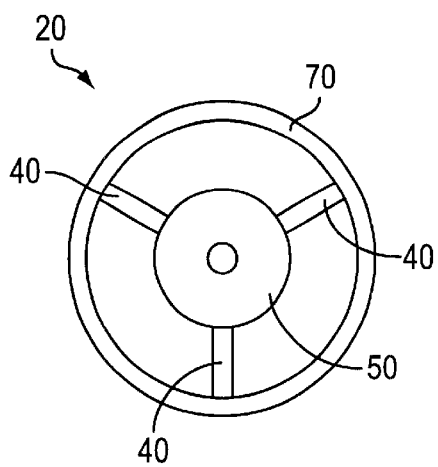
FIGS. 3–9 are top view of alternative embodiments of the pet restraint of FIG. 1.

FIG. 3 illustrates the use of a continuous circular stop member 70 positioned around the outside of the snag-free surface members 40. In FIGS. 1, 2 and 11, the triangular stop member 60 is positioned at a lesser radial distance with respect to the stake 30 than the stop member 60. The positioning of the stop member 60 (FIGS. 1, 2 and 11) before or within the snag-free surface members 40 (FIGS. 1, 2 and 11) is preferable to the positioning of the stop member 70 (FIG. 3) around the members 40, since a leash 15 might get snagged between the stop member 70 and the ground 100 if the apparatus is not properly installed and if the stop member is lifted slightly, or not flush with the ground. In the preferred embodiment of FIGS. 1, 2 and 11, a slight lifting of the restraint 20 from the ground 100 will not result in a discontinuity along the snag-free surface member 40 between the leash-receiving section 37 and the ground 100, unless, of course, the ground-engaging elements 42 are also completely withdrawn from the ground 100.

Figure 4:
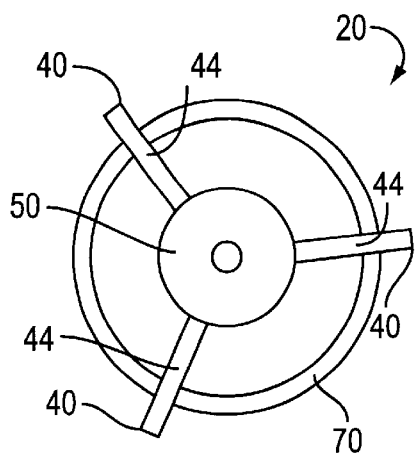

FIG. 4 illustrates an embodiment of a pet restraint 20 having a circular stop member 70 connected to the snag-free surface members 40 along their outwardly flared portions 44. In FIGS. 1, 2 and 11, the stop member 60 is connected to the downwardly projecting portions 42 of the members 40. In the embodiment of FIG. 4, the stop member 70 serves a primarily supportive function, adding rigidity to the snag-free surface members 40. Once the restraint 20 of FIG. 4 has been initially inserted into the ground 100, with the ground-engaging members 42 penetrating therein, further insertion of the restraint 20 of FIG. 4 into the ground 100 will be hampered by the engagement of the outwardly flared portions 44 of the members 40 with the ground 100 near the transition between the downwardly projecting portions 42 and the outwardly flared portions 44. Thus, while the use of a stop member is preferred for added structural integrity, it is not necessary to the operation of the restraint as a ground-insertion prevention means.

Figure 5:
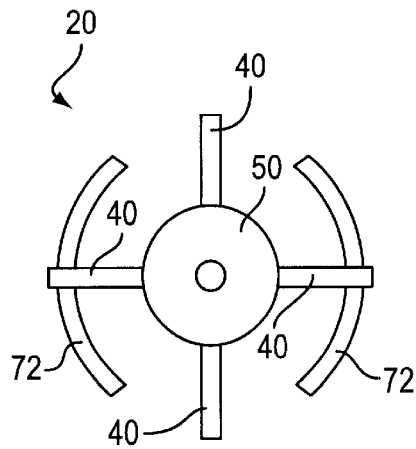

FIG. 5 illustrates an embodiment of a pet restraint 20 having a discontinuous stop member 72 connected to two of the four snag-free surface members 40. It will be appreciated that the number of snag-free surface members 40 used may be variable (FIGS. 1, 2 and 11 show the use of three members 40), and it will also be appreciated that the nature of the stop member may vary as well. From a structural viewpoint, it is obviously preferable to have a continuous stop member connected between the snag-free surface members than a discontinuous stop member connected between less than all of the snag-free surface members.

Figure 6:
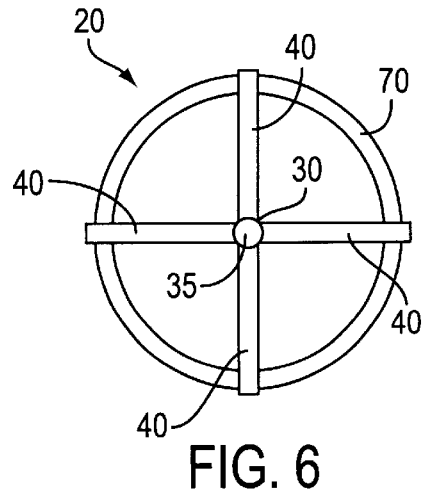

FIG. 6 illustrates an embodiment of a pet restraint 20 without a connecting plate 50 (see FIGS. 1, 2 and 11) between the snag-free surface members 40 and the stake 30. As discussed in connection with the preferred embodiment of FIGS. 1, 2 and 11, the connecting plate 50 preferably provides a smooth contact surface for the movable coupling 37 (see FIG. 11). While the use of a connecting plate is preferred, it is not critical to the operation of the restraint 20.

Figure 7:
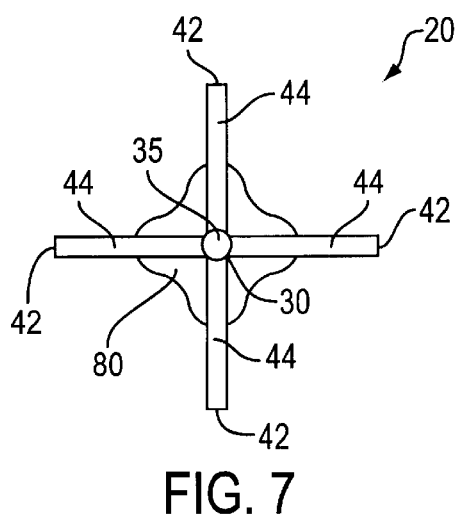

FIG. 7 illustrates an embodiment of a pet restraint 20 having a stop member 80 connected to the stake 30 and not to the snag-free surface members 40. The stop member 80 may be planar as shown, and of any size, shape or configuration, or it may be non-planar as shown in previous embodiments. In the embodiment of FIG. 7, the stop member 80 does not provide any structural support to the members 40, and is merely positioned along the stake 30 to prevent insertion of the stake 30 into the ground 100 past a predetermined depth. Such stop member 80 may be fixed along the longitudinal axis of the stake 30, or it may be adjustable as desired.

Figure 8:
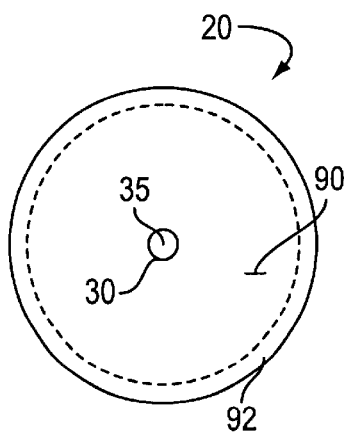

FIG. 8 illustrates an embodiment of a pet restraint 20 having a continuous, preferably spherical, snag-free surface member 90 connected to and around the stake 30 and terminating in a ground-engaging edge 92. FIG. 12 illustrates the insertion of the restraint 20 of FIG. 8 into the ground 100, with the leash coupling 37 and leash 15 not shown for purposes of illustration. In addition, the stake of FIG. 12 is not provided with rotation-prevention members 33,35. With reference to the embodiment of FIGS. 8 and 12, the ground-engaging prongs 40 of previous figures is replaced with a single, continuous surface 90 connected to the stake 30 and extending between the leash-receiving section 36 and the ground 100. A downwardly projecting ground-engaging element or edge 92 may be smooth or discontinuous, i.e., serrated or the like, and adapted to maintain the upper end 34 of the stake 30 at a distance from the ground 100. The ground-engaging element 92 serves the same purpose as the ground-engaging elements 42 of the previous figures, i.e., to provide additional support to the stake 30 while planted and to provide a snag-free surface between the stake 30 and the ground 100 for the prevention of snagging and/or tangling of a leash 15 thereabout.

Figure 9:
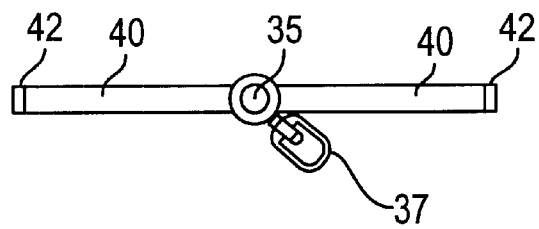
Figure 10:
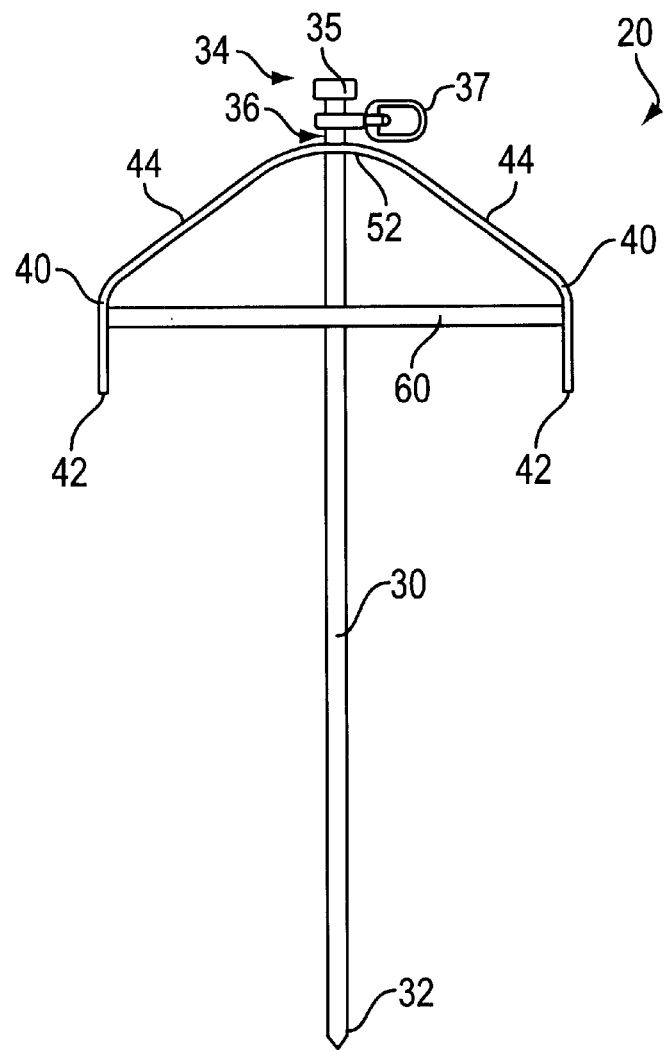
FIG. 10 is a front view of the pet restraint of FIG. 9.

FIG. 9 is a top view and FIG. 10 is a front view of an embodiment of a pet restraint 20 having two ground-engaging prongs 40 positioned at opposite sides of the stake 30 with a stop member 60 extending therebetween. For purposes of illustration in FIGS. 9 and 10, the coupling 37 is shown and the rotation-prevention members 33,35 are not shown. The embodiment of FIGS. 9 and 10 is particularly suited for highly efficient packaging, allowing successive restraints to be horizontally stacked or vertically displayed in close proximity to each other. The restraint 20 of FIG. 9 forms a more or less planar profile, yet without sacrificing its tangle-free, snag-free operation. A radius-type section 52 provides the connection between the prongs 40 and the stake 30 and further acts as both a contact surface and a stop for the coupling 37. Use of this radius-type section 52 assists in the trimmed down profile, as compared, for example, with the connection plate used in the embodiments of FIGS. 1–5. While the embodiment of FIGS. 9 and 10 is preferred over other embodiments for purposes of efficient packaging, other embodiments might be more preferable depending on the active nature of the animal being restrained, particularly if it is desired to have more than two ground-engaging prongs supporting the stake.

The construction of the pet restraint 20 of the several embodiments described above is clearly a conspicuous element as compared with, for example, a simple stake augured into the ground. In this respect, the restraint 20 may be further embellished with coloring or the like that makes the restraint highly distinguishable from conventional ground cover and its surroundings.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. A ground-insertable, tangle free pet restraint comprising:
   a) an elongated stake having a lower end adapted to be inserted into the ground and an upper end adapted to be positioned at a distance above the ground,
   b) a leash-receiving section adjacent said upper end of said stake,
   c) a snag free surface member positioned between said leash-receiving section and the ground when said pet restraint has been inserted therein and terminating in at least one ground-engaging element for maintaining said upper end of said stake at a distance from the ground when said pet restraint has been inserted therein and for preventing a leash attached at said leash-receiving section from tangling thereon, and
   d) a stop member connected to said elongated stake for inhibiting the insertion of said stake into the ground, said stop member connected along said snag free surface member.

2. A pet restraint in accordance with claim 1, wherein said snag free surface is continuous around said stake.

3. A pet restraint in accordance with claim 2, wherein said snag free surface is spherical.

4. A pet restraint in accordance with claim 1, further comprising at least one rotation-prevention member attached to said stake to impede rotation of said restraint when inserted into the ground when said pet restraint has been inserted therein.

5. A pet restraint in accordance with claim 1, wherein said restraint further comprises a plurality of rotation prevention members.

6. A pet restraint in accordance with claim 5, wherein at least two of said rotation prevention members are arranged in different orientations.

7. A pet restraint in accordance with claim 1, wherein said leash-receiving section further comprises a coupling movable around said elongated stake for coupling a leash to said leash-receiving section.

8. A pet restraint in accordance with claim 7, further comprising a leash coupled to said leash-receiving section.

9. A pet restraint in accordance with claim 1, further comprising a leash coupled to said leash-receiving section.

10. A ground-insertable, tangle free pet restraint comprising:
    a) an elongated stake having a lower end adapted to be inserted into the ground and an upper end adapted to be positioned at a distance above the ground,
    b) a leash-receiving section adjacent said upper end of said stake for attachment of a leash to said restraint,
    c) a snag free surface member positioned between said leash-receiving section and the ground when said pet restraint has been inserted therein and terminating in at least one ground-engaging element for maintaining said upper end of said stake at a distance from the ground when said pet restraint has been inserted therein and for preventing a leash attached at said leash-receiving section from tangling thereon,
    d) wherein said snag free surface comprises a plurality of prongs connected to said stake, and
    e) a stop member connected to at least one of said prongs for inhibiting the insertion of said elongated stake into the ground.

11. A pet restraint in accordance with claim 10, wherein said prongs are connected to said stake via a connection plate.

12. A pet restraint in accordance with claim 11, wherein said connection plate is disc-shaped.

13. A pet restraint in accordance with claim 10, wherein said prongs are evenly spaced apart.

14. A pet restraint in accordance with claim 10, wherein a portion of said ground-engaging prongs is positioned at an angle to the longitudinal axis of the elongated stake.

15. A pet restraint in accordance with claim 10, wherein said snag free surface comprising said prongs are outwardly flaring and said ground engaging element is downwardly projecting.

16. A pet restraint in accordance with claim 10, wherein said stop member is connected to the plurality of ground-engaging prongs.

17. A pet restraint in accordance with claim 10, wherein said stop member is continuous.

18. A pet restraint in accordance with claim 10, wherein said ground engaging elements of said prongs are positioned at a greater radial distance with respect to the elongated stake than said stop member.

19. A pet restraint in accordance with claim 10, wherein said ground engaging elements of said prongs are positioned at a lesser radial distance with respect to the elongated stake than said stop member.

20. A ground-insertable pet restraint comprising:
    a) a first ground-engaging member having an upper end and a lower end,
    b) a second ground-engaging member connected to said first ground-engaging member at a first connection location, said second ground-engaging member further comprising a first section extending outwardly at a first acute angle from said first ground-engaging member and a second section extending and at a second angle from said first second and
    c) a leash-receiving section disposed along said first ground-engaging member between said upper end of said first ground-engaging member and said first connection location for attachment of a leash to said restraint,
    d) whereas a snag free surface along said second ground-engaging member between said first ground-engaging member and the ground is realized for preventing a leash attached at said leash-receiving section from tangling thereon.

21. A ground-insertable pet restraint in accordance with claim 20, further comprising a stop member connected to one of said first or second ground-engaging members for inhibiting the insertion of said restraint into the ground and for maintaining said upper end of said first ground-engaging member at a distance from ground.

* * * * *